United States Patent [19]
Golden

[11] Patent Number: 5,933,815
[45] Date of Patent: Aug. 3, 1999

[54] COMPUTERIZED METHOD AND SYSTEM FOR PROVIDING GUARANTEED LIFETIME INCOME WITH LIQUIDITY

[75] Inventor: Jerome S. Golden, Scarsdale, N.Y.

[73] Assignee: The Equitable Life Assurance Society of The United States, New York, N.Y.

[21] Appl. No.: 08/432,101

[22] Filed: May 1, 1995

[51] Int. Cl.[6] ........................................... G06F 15/20
[52] U.S. Cl. ........................ 705/35; 705/36; 705/40
[58] Field of Search .................... 364/408, 401, 364/406, 407; 395/144, 145, 236, 235, 238, 239, 242, 240; 705/35, 36, 40

[56] References Cited

U.S. PATENT DOCUMENTS

| | | | |
|---|---|---|---|
| 4,597,046 | 6/1986 | Musmanno et al. | 364/408 |
| 4,642,768 | 2/1987 | Roberts . | |
| 4,648,038 | 3/1987 | Roberts et al. . | |
| 4,722,055 | 1/1988 | Roberts . | |
| 4,752,877 | 6/1988 | Roberts et al. . | |
| 4,839,804 | 6/1989 | Roberts et al. . | |
| 4,953,085 | 8/1990 | Atkins . | |
| 5,083,270 | 1/1992 | Gross et al. | 364/408 |
| 5,101,353 | 3/1992 | Lupien et al. | 364/408 |
| 5,126,936 | 6/1992 | Champion et al. . | |
| 5,132,899 | 7/1992 | Fox | 364/408 |
| 5,136,502 | 8/1992 | Van Remortel et al. . | |
| 5,193,056 | 3/1993 | Boes . | |
| 5,214,579 | 5/1993 | Wolfberg et al. | 364/408 |
| 5,237,500 | 8/1993 | Perg et al. | 364/408 |
| 5,291,398 | 3/1994 | Hagan . | |
| 5,471,575 | 11/1995 | Giansante | 395/144 |
| 5,517,406 | 5/1996 | Harris et al. | 364/408 |
| 5,523,942 | 6/1996 | Tyler et al. | 364/401 |
| 5,592,379 | 1/1997 | Finfrock et al. | 395/239 |
| 5,631,828 | 5/1997 | Hagan | 395/204 |
| 5,644,727 | 7/1997 | Atkins | 395/240 |

FOREIGN PATENT DOCUMENTS

WO 92/22036   12/1992   European Pat. Off. .

OTHER PUBLICATIONS

Turning a 401(k) into a defined benefit, *Institutional Investor*, Nov. 1994.

Gaudio, P. and Nicols, V., *Your Retirement Benefits*, John Wiley & Sons, Inc. 1992, Chapter 14, pp. 156–168.

(List continued on next page.)

*Primary Examiner*—Bryan Tung
*Assistant Examiner*—Anand S. Rao
*Attorney, Agent, or Firm*—Cowan, Liebowitz & Latman, P.C.; Brown Raysman Millstein Felder & Steiner

[57] ABSTRACT

Computerized method and system for administering at least part of a program to provide a person with guaranteed lifetime income with a measure of liquidity using at least an initial contribution of assets such as from an IRA. The amounts of a series of periodic distributions or payments to be made during first and second periods in the person's life are calculated based on an information profile and stored financial and actuarial data. The first or "guaranteed" period begins on a given date and has a definite duration, and the second or "life contingent" period begins after the first period and extends for as long as the person or joint annuitant lives. A first portion of the contribution is allocated towards the purchase of at least one guaranteed financial vehicle having a determinable market value at any time so as to be capable of being liquidated and which will provide the person with periodic distributions during the first period. These guaranteed financial vehicles are preferably serially maturing Guaranteed Interest Rate Options. A second portion of the initial contribution is allocated towards the purchase of at least one life contingent financial vehicle such as a life contingent annuity which will provide the person with periodic distributions for as long as the person or joint annuitant lives. A further portion of the initial contribution could be invested in non-guaranteed financial vehicles to provide a greater return, which return is periodically used to purchase additional guaranteed and/or life contingent financial vehicles.

45 Claims, 7 Drawing Sheets

OTHER PUBLICATIONS

Kindle, K., Cann, R., Craig, M., and Martin, T., PFPS: Personal Financial Planning System, *Innovative Applications of Artificial Intelligence*, 1989, pp. 51–61.

*Wall Street & Technology*, vol. 11, No. 8, 1994, various pages.

Koco, Linda, *New Transamerica UL Plan Targeting The 50+ Market*, National Underwriter, Mar. 30, 1992 (printed from Lexis).

National Travelers Life Co. filing with Commissioner of Insurance, Insurance Division of Iowa, for approval of single premium immediate annuity forms and companion application, Jun. 22, 1994.

"Retirement decision matrix for employees of non–profit organizations" from the *Proceedings of the 16th Annual Meeting of the American Institute for Decision Sciences*, pp. 617–618 by Heywood et al., Nov. 5, 1984.

"Enter the risk zone—Roger Taylor looks at how to save tax by investing in unquoted business" from the *Financial Times of London*, pp. 9 IX, by Roger Taylor, Mar. 25, 1995.

"Take advice and get your timing right—Annuities/ The wrong choice at the wrong moment could reduce you money by a third" from the *Financial Times of London*, p. 20 XX, by Debbie Harrison, Jan. 27, 1995.

FIG. 3

ASSURED PAYMENT PLAN

Quote Date: 4/30/95  Prepared For: Mr. & Mrs. G. Retiree  Prepared By: J. Representative

Personal Description
- Contribution: $100,000
- Deferral Period (in Years): 0
- Certain Period (in Years): 15
- Assumed Tax Rate: 34%

Life Contingent Annuity:
- Male : Female Ages: 70 : 65
- Increasing Payments: Yes
- Joint & Survivor %: 66 2/3

Income Summary (All Payments are Annual)

| | Starting | Increase during Period |
|---|---|---|
| During Certain Period (1996 - 2010) | | Every 3 Years by 10% |
| Payment (Total : $110,521) | $6,034 | |
| Excludable Amount (1) | $3,629 | |
| After Tax Income | $5,217 | |
| During Life Contingent Period (2011 and later) | | Annually Minimum of CPI or 3% |
| Payment while both are living | $9,718 | |
| Payment while only one is living | $6,479 | |

(1) Can only exclude from taxation until the investment is recovered.

| Maturity Date | Annual Payment | Price (Per $100 of Contribution) | Contribution Allocated (to Maturity) |
|---|---|---|---|
| Certain Period | | | |
| 2/15/1996 | $6,034 | 96.15 | $5,802 |
| 2/15/1997 | $6,034 | 90.97 | $5,489 |
| 2/15/1998 | $6,034 | 85.71 | $5,172 |
| 2/15/1999 | $6,638 | 80.69 | $5,356 |
| 2/15/2000 | $6,638 | 76.08 | $5,050 |
| 2/15/2001 | $6,638 | 71.35 | $4,736 |
| 2/15/2002 | $7,302 | 66.72 | $4,871 |
| 2/15/2003 | $7,302 | 62.17 | $4,540 |
| 2/15/2004 | $7,302 | 57.97 | $4,233 |
| 2/15/2005 | $8,032 | 53.93 | $4,331 |
| 2/15/2006 | $8,032 | 51.31 | $4,121 |
| 2/15/2007 | $8,032 | 48.24 | $3,874 |
| 2/15/2008 | $8,835 | 45.35 | $4,007 |
| 2/15/2009 | $8,835 | 42.63 | $3,766 |
| 2/15/2010 | $8,835 | 40.07 | $3,540 |
| | | | $68,889 |
| Life Contingent Period | | | |
| 2011 and later | $9,718 | 299.55 | $29,111 |
| TOTAL | | | $98,000 (3) |

(3) Reflects State Premium Tax of $2,000 - KY.

Conditions: This quotation is applicable only for contributions received at our office on 4/30/95 and if no lump sum withdrawals are taken thereafter. Rates change daily. Lump sum withdrawals will have an adverse effect on your Plan. This quotation must be preceded or accompanied the Assured Payment Plan Prospectus which contains detailed information, including fees and charges, as well as a description of the result of taking a lump sum withdrawal. Read it carefully before you invest.

Note: If your contribution comes from multiple sources, this quotation is an estimate. The allocation of funds will be made on the Business Day on which the last amount is received and will be based on rates available on that Business Day.

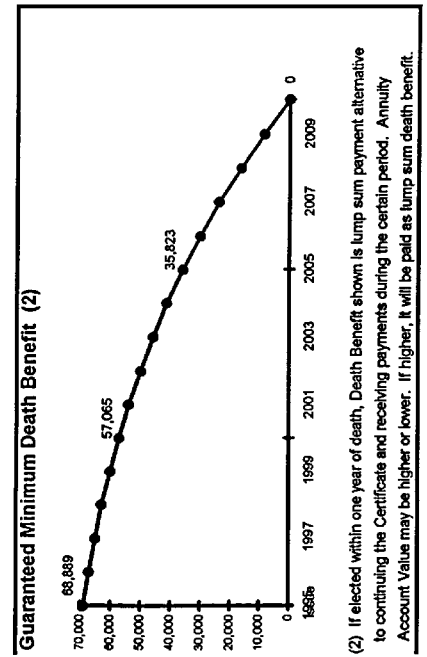

Guaranteed Minimum Death Benefit (2)

(2) If elected within one year of death, Death Benefit shown is lump sum payment alternative to continuing the Certificate and receiving payments during the certain period. Annuity Account Value may be higher or lower. If higher, it will be paid as lump sum death benefit.

IM - 95 - 05a     The Equitable Life Assurance Society of the United States, NY, NY 10019

COMPUTERIZED METHOD AND SYSTEM FOR PROVIDING GUARANTEED LIFETIME INCOME WITH LIQUIDITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office public patent files or records, but otherwise reserves all copyright rights whatsoever.

BACKGROUND OF THE INVENTION

This invention relates generally to computerized insurance methods and systems, and, more particularly, to a computer system and computerized method for implementing and administering a program to provide a person with guaranteed lifetime income based on at least an initial contribution of assets, such as from a rollover individual retirement account ("IRA") or qualified or non qualified retirement plan, while providing the person with a measure of liquidity in the assets invested in the program.

An annuity is a well-known financial vehicle used to pay a person a certain sum of money in a series of distributions made at regular intervals, such as monthly or annually, based on a given amount of principal consisting of an initial contribution of assets and any subsequent contributions. Annuities are available in many forms. The distributions may be made for a predetermined definite period, as in an annuity certain, or for as long as the person lives, as in a life annuity. Payments under a life annuity may terminate on the annuitant's death, as in a straight life annuity, or may continue to a beneficiary for a specified period after the annuitant's death, as in a life annuity with period certain. Alternatively, a life annuity may be based on two lives jointly, as in a joint and last-survivor annuity in which payments continue to be made to the survivor for the remainder of his or her life, or may provide a beneficiary a lump sum payment upon the death of the annuitant. The payments under an annuity may be set to begin one payment interval after purchase of the annuity, as in an immediate annuity, or after a specified amount of time, as in a deferred annuity.

Retirement assets, such as IRAs and tax-deferred retirement plans, are widely used as tax deferred investments to provide retirees with income after their retirement. Upon retirement, a retiree may have access to one or more such tax deferred assets as well as other liquid assets which have accumulated over time. Because these assets may be an important source of income for the remainder of his or her life, it is extremely important for the retiree to make optimal use of them. Clearly, it is undesirable for the retiree to consume the assets too quickly and not retain sufficient funds to live on thereafter. Conversely, many retirees also find it undesirable to consume assets too slowly, thus making sacrifices in their standards of living, and then die owning substantial assets which often pass to their children who may not need them.

In addition, retirees often consider it highly important to keep their retirement assets substantially liquid, i.e., to be able to withdraw as cash or to convert to cash all or a large portion of the assets on relatively short notice, such as in the event of a medical emergency or family celebration. Therefore, it is important that the assets not be locked up in a financial vehicle which makes them inaccessible or illiquid.

No program exists, to the knowledge of the inventor, which can provide both continuous guaranteed lifetime income and partial liquidity, i.e., the ability to make a partial withdrawal and retain an adjusted continuous guaranteed lifetime income. While life annuities may be used to provide lifetime income to the retiree, they do not satisfy the liquidity needs of retirees, and life annuities starting at a relatively early retirement age. On the other hand, other financial vehicles (e.g. bond funds) which may provide a retiree with income and liquidity do not provide the retiree with the necessary guaranteed lifetime income. Furthermore, in the case of other financial vehicles, most do not make optimal use of retirement assets, as described above.

Therefore, there is a need for a program which makes optimal use of retirement and other types of assets to provide a retiree or other person with continuous guaranteed lifetime income over potentially long periods while still providing the person with a substantial amount of liquidity in the assets. The computerized method and system of the present invention fill this need.

SUMMARY OF THE INVENTION

It is an object of the present invention to implement and administer a program to provide guaranteed lifetime income to a person based at least on an initial contribution of assets while providing the person a measure of liquidity in the assets.

It is another object of the present invention to optimize the use of retirement assets while providing the retiree with guaranteed income for the remainder of his or a joint annuitant's life.

It is another object of the present invention to provide a computerized method and a computer system which automatically allocates an initial contribution of assets, such as from an IRA or retirement plan, according to a desired payment plan among a series of guaranteed financial vehicles with a determinable market value and at least one life contingent financial vehicle.

The above and other objects of the invention are accomplished by a computerized method and system for administering at least part of a program to provide a person with guaranteed lifetime income with a measure of liquidity using at least an initial contribution of assets. The amount of each of a series of periodic distributions or payments to be made for the person's life during at least a first and a second period in the person's lifetime is calculated based on information provided by the person and stored data. The first period begins on a given date and has a definite duration and the second period begins sometime after the end of the first period and extends at least for as long as the person is alive. Also, a first portion of the initial contribution is allocated towards the purchase of at least one guaranteed financial vehicle having a determinable market value at any time so as to be capable of being liquidated and which will provide the person with at least one of the periodic distributions during the first period, and a second portion of the initial contribution is allocated towards the purchase of at least one life contingent financial vehicle which will provide the person with one or more of the periodic distributions during the second period for as long as the person lives. These financial vehicles can be considered a client account from which distributions are made and from which partial and full withdrawals may be made of the portion allocated for the purchase of at least one guaranteed financial vehicle. The method and system provide the ability to make partial withdrawals from the client account and retain an adjusted continuous guaranteed lifetime income.

In the preferred embodiments, the periodic distributions are provided during the first, time certain period from a plurality of serially maturing guaranteed financial vehicles in the form of Guaranteed Interest Rate Options ("GIRO"), which are vehicles whose maturity values are predetermined based on an applicable interest rate and whose market values may be determined on any given date prior to maturity based on currently applicable interest rates. Other financial vehicles with similar properties may be used, such as zero coupon bonds or other market value annuities. The periodic distributions are provided during the second, life contingent period from a life contingent annuity ("LAC"), which provides income to the person and a joint annuitant, if any, for the life of the person and/or joint annuitant. The period for distributions may be any desired period, such as annually, monthly or weekly. In the preferred embodiments, the distributions are made annually.

The calculation of the amounts of the periodic distributions to be made may include the calculation of purchase rates for each of the financial vehicles based on information provided by the person and inputted into a programmed computer, and financial and statistical data stored in the memory of the programmed computer. The person may specify either an initial contribution to be provided, such as from a rollover IRA, or a target income payment the client wishes to receive. Also, the person may specify a particular payment plan under which distributions are to be made which, in the preferred embodiments, includes a choice of receiving level distributions or regularly increasing distributions. The amount of the periodic distributions is calculated and, when a target income payment is specified, the amount of the initial contribution necessary to provide those distributions is calculated. Using the purchase rates for the financial vehicles, the amounts necessary to allocate from the initial contribution in order to purchase the financial vehicles are calculated.

The objects of the present invention are also accomplished by a computer system and method for processing and administering a client account comprising a combination of serially maturing guaranteed financial vehicles having a determinable market value at any time so as to be capable of being liquidated and at least one life contingent financial vehicle. The client account provides the client with lifetime income based at least on an initial contribution of assets. The initial contribution of assets is received, and processing means calculates an amount of each of a series continuous of periodic distributions to be made for the person's life during at least a first, time certain period and a second, life contingent period in the person's lifetime based on an information profile and stored data. A first portion of the received initial contribution is allocated towards the purchase of the guaranteed financial vehicles which will provide the person with periodic distributions during the certain period when the person will be able to make a full or partial withdrawal of the remaining amount of the first portion at its market value. A second portion of the initial contribution is allocated towards the purchase of the at least one life contingent financial vehicle which will provide the person with periodic distributions during the life contingent period for as long as the person lives. The guaranteed financial vehicles are purchased with the first portion and the at least one life contingent financial vehicle with the second portion. The financial vehicles may be purchased in a manner known in the art. Once purchased, record keeping and reporting may proceed in a manner known in the art.

Also, messages may be provided on the dates the periodic distributions are to be made so that payments may be made to the client.

According to at least three other, partially non-guaranteed embodiments, the program includes, in addition to purchasing financial vehicles which provide a guaranteed income during the first and second periods, investing assets in non-guaranteed financial vehicles, e.g., stocks, mutual funds, etc. Such non-guaranteed financial vehicles generally provide for greater returns than guaranteed vehicles, although they entail greater risk as well.

In a first of these other embodiments (referred to below as "Guarantee Plus"), the program provides a guaranteed minimum level of lifetime income during the first and second periods which may be increased, but not decreased below the minimum, depending upon the performance of the investments in the non-guaranteed financial vehicles. For example, the allocation of an initial contribution of assets among a series of GIROs with regularly increasing distributions and an LCA may be calculated as in the fully guaranteed embodiment described above. However, subsequent GIROs (i.e., GIRO maturing after the initial GIRO distribution) and the LCA are only actually purchased so as to provide distributions at the level of the initial GIRO distribution, so that these distributions will only be guaranteed in the amount of the initial distribution from the first GIRO. The difference between the allocation to GIROs and LCA in the amount of the initial GIRO distribution and the allocation to GIROs and LCA for increasing distributions is invested in the non-guaranteed financial vehicles. Depending upon the performance of the non-guaranteed financial vehicles, additional GIROs and additional LCA segments may be purchased from assets in the non-guaranteed financial vehicles at any time up to the start of the second period. Here, the retiree can select the degree of risk he or she is willing to undertake from among the available non-guaranteed financial vehicles, knowing that he or she will still have a minimum guaranteed lifetime income based on the initial GIRO distribution amount and the corresponding LCA, with the possibility of increasing the income level at any time before the start of the second period, while preserving the measure of liquidity during the first time period.

In a second of the partially non-guaranteed embodiments (referred to below as "Managed Payment Program"), the program provides a guaranteed minimum level of income during the first period, and a target guaranteed income during the second period, with the first and second periods being separated by an intermediate period or a series of intermediate periods in which the level of income is adjusted in accordance with the performance of non-guaranteed financial vehicles in which a portion of the initial contribution is invested. In this embodiment, in addition to allocating portions of the initial contribution to purchase GIROs and the LCA, the program allocates a third portion of the initial contribution for the purchase of non-guaranteed financial vehicles. Thus, a first portion of the initial contribution is allocated to purchase one or more GIROs which are guaranteed to provide a given level of income during the first period, a second portion is allocated to purchase an LCA guaranteed to provide the given level of income during the second time period, and the third portion is invested during the first period in the non-guaranteed financial vehicles. At the end of the first period, an intermediate period is entered in which one or more GIROs are purchased with proceeds from investments in the non-guaranteed financial vehicles to provide a guaranteed level of income for a certain time. The amount of such increase will be dependent upon the prior performance of the non-guaranteed financial vehicles. The second (LCA) period may follow this intermediate period. Alternatively, a new intermediate period can be created by the investment of assets in GIROs and/or non-guaranteed financial vehicles. After each intermediate period, the LCA may have to be adjusted if the retiree wishes to increase the guaranteed target income from the by purchasing additional LCAs, or to change the starting date of the LCA, thereby also changing the amount of the periodic distributions. The first and intermediate periods will be selected to span the period from the inception of payments from the first GIRO to the inception of the LCA, and may involve any number of intermediate periods. Here, the retiree may also select the risk he or she wishes to take in investing in the non-guaranteed financial vehicles, but unlike the first partially non-guaranteed embodiment, does not have guaranteed income throughout the program, which could provide a decreased level of income if the investments perform poorly.

A third partially non-guaranteed embodiment (referred to below as "Guarantee Plus Plus") is a hybrid of the first two embodiments and involves at least two types of intermediate periods—at least one first intermediate period similar to the type of intermediate period involved in the first partially non-guaranteed embodiment, and a second intermediate period similar to the type of intermediate period involved in the second partially non-guaranteed embodiment. In this embodiment, GIROs for the minimum calculated distribution are purchased for the first, certain period and for the first intermediate period, and the difference between the minimum distribution and the calculated increases in the first intermediate period is invested in non-guaranteed financial vehicles. The entire amount allocated to the second intermediate period is invested in non-guaranteed financial vehicles, and an LCA is purchased for the life contingent period. This embodiment provides a mix of security and risk for retirees.

The computer system and the programmed computer of the present invention include computer hardware and software. The hardware comprises at least one each of a processor and a memory device, and preferably also includes at least one output device and at least one input device. All of these elements and the manner in which they are connected are well-known in the art. In addition, one skilled in the art will recognize that these elements need not be connected in a single unit such as a personal computer or mainframe, but may be connected over a network or via telecommunications links. Connection over a network arrangement is preferred so that the data stored in the memory device and used by the computer system to calculate purchase rates may be regularly updated from a central location and made available to brokers at remote locations. The invention is implemented on the hardware by software programs which, in a preferred embodiment, include a spreadsheet program implemented with the Excel spreadsheet program available from Microsoft Corporation.

BRIEF DESCRIPTION OF THE DRAWINGS

The invention is illustrated in the figures of the accompanying drawings which are meant to be exemplary and not limiting, in which like references refer to like or corresponding parts, and in which:

FIG. 3 is a report generated by a computer system of the present invention.

DETAILED DESCRIPTION OF THE PREFERRED EMBODIMENTS

The preferred embodiments of the present invention will be described herein with reference to the drawings and the formulas in the Spreadsheet Appendix. The computer system of a preferred embodiment shall be referred to herein as the "Income Manager System."

Figure 1:
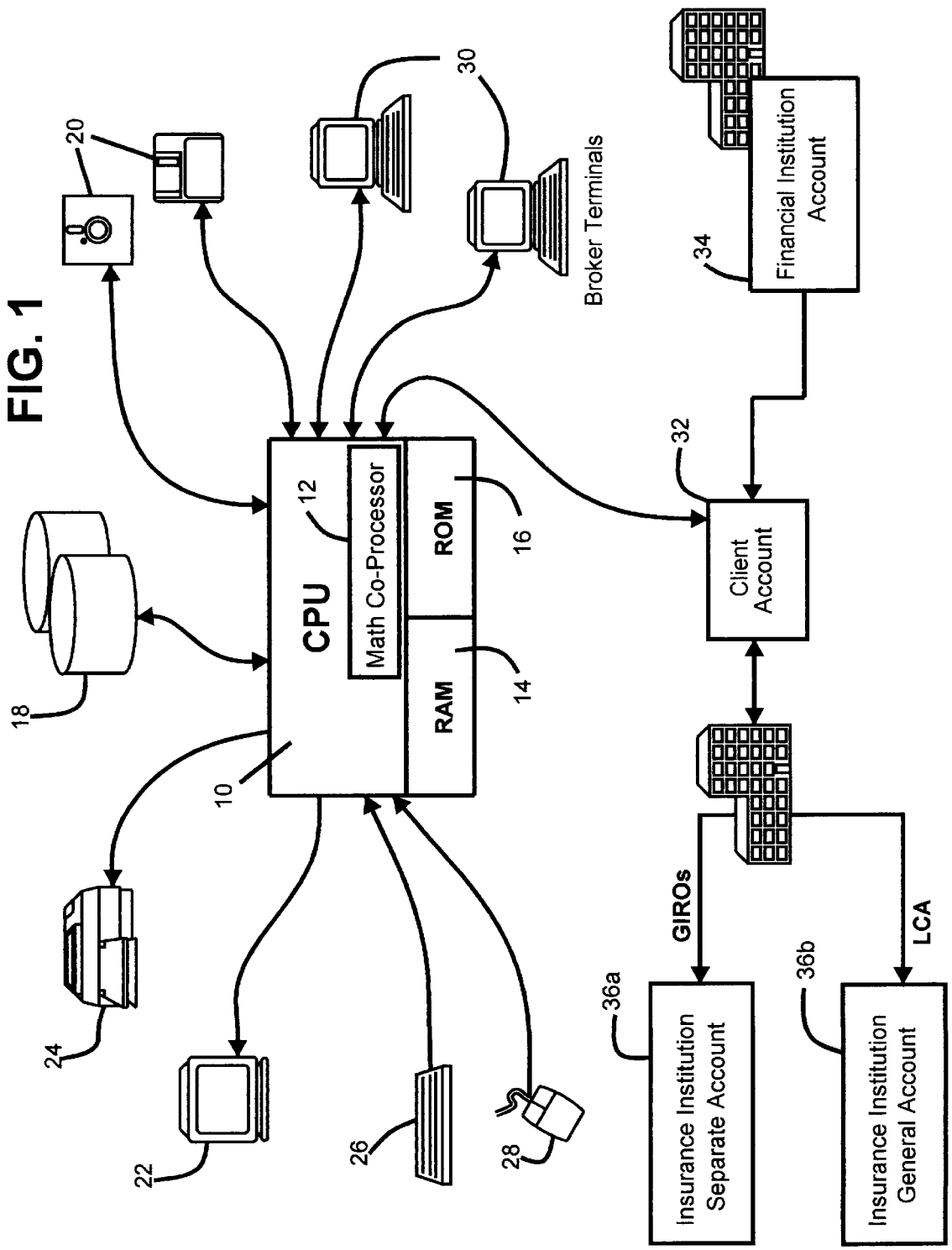
FIG. 1 is a block diagram of a computer system (including a computer program) according to the present invention.

The computer system of the present invention comprises both hardware and software elements. With reference to FIG. 1, the hardware comprises a central processing unit 10, a math coprocessor 12 which, depending on the CPU model used, may be separate from the CPU 10 or a part thereof, one or more RAM memory devices 14 and ROM memory devices 16, and other magnetic or optical memory storage devices including hard disk storage 18 and one or more floppy disk drives 20. The hardware also includes a display monitor 22, a printer 24, a keyboard 26, and a mouse 28.

The hardware used in connection with the Income Manager System is an IBM-compatible personal computer having a 80486 model CPU or higher, which incorporates a math coprocessor, a color VGA display monitor, at least 4 MB of RAM memory, and a hard disk accessible locally or over a network with at least 50 MB available. The personal computer is operated by the MS-DOS® operating system and the Windows™ operating system version 3.1 or higher, both available from Microsoft Corporation of Redmond, Wash. The invention may be practiced in other computer environments, such as the Macintosh® personal computer environment available from Apple Computer of Cupertino, Calif.

Although the computer hardware described above may operate as a stand-alone system, it is preferable to connect a series of broker terminals 30, which may be personal computers, to the system, either via a local area network or via telecommunications link with the use of modems. The broker terminals may be used to implement the present invention for a number of clients simultaneously while providing the ability to periodically update the data used by the system to calculate purchase rates, including interest rates and mortality tables as explained below, from a central location.

Some of the software for the Income Manager System is a spreadsheet operable with the Excel spreadsheet program available from Microsoft Corporation. The formulas for the spreadsheet cells necessary to implement the present invention are set forth in the Spreadsheet Appendix attached hereto. One skilled in the art will recognize that many other spreadsheet or programming languages may be utilized to implement the present invention, such as the Lotus 1-2-3 spreadsheet program available from Lotus Development Corporation or APLII programming language. The formulas listed in the Spreadsheet Appendix may be used by one skilled in the art to program a spreadsheet or to write source code using any conventional programming language to implement the present invention.

A brief explanation of the financial basis underlying the present invention may be helpful in understanding the operation of the Income Manager System. A prospective client may be a retiree having retirement assets such as an IRA, a tax-deferred retirement plan, a non-qualified annuity or other asset which has accumulated on a nontax-deferred basis, who is seeking to obtain retirement income from the assets. Alternatively, the prospective client may be a person planning for retirement and desiring a financial vehicle which will accumulate on a tax-deferred basis. The client provides the assets to an insurance company, such as the inventor's assignee The Equitable Life Assurance Society of the United States, as the initial contribution towards the purchase of a certificate or an individual contract evidencing the client's rights. The insurance company may require a minimum amount for the issuance of a certificate, such as $10,000.

The retirement income is provided during two periods of the client's life through two types of financial vehicles. During a first, time certain period, periodic distributions from the assets are provided by at least one and preferably a series of serially maturing Guaranteed Interest Rate Options ("GIRO"s), which are similar to a series of zero coupon bonds maturing at an initially determined payment level. The distributions are made on an arbitrarily determined maturity date, which, in the preferred embodiment, is February 15 of each succeeding year. Subject to restrictions which may be imposed by the insurance company, the certain period may be set to start immediately, i.e., the first distribution may be made on the first maturity date following the transaction date, or may be deferred by a desired number of years.

Each amount allocated from the initial contribution to the purchase of a GIRO accumulates at a guaranteed rate which is the interest rate applicable on the transaction date, i.e., the date the initial contribution is received by the insurance company or the date a transaction request is processed by the Income Manager System. On the expiration date of each GIRO, the GIRO has a maturity value equal to the amount of a periodic distribution to be made to the client on that date. Using the applicable interest rate, the maturity value of a GIRO may be determined as of the time it is purchased. Thus, it is possible to calculate the amount necessary to purchase a GIRO so that it will have a desired maturity value upon expiration. The method of making this calculation is explained further below.

Each GIRO has a "market" "value" (as explained herein) on any given day from the day it is purchased until it matures. As explained further below, the market value for any given GIRO on a given day may be found using the interest rate applicable to new allocations for the period of the given GIRO in effect on the given day. The ability to calculate the market value of one or more GIROs provides clients the ability to withdraw all or part of the assets invested in one or more GIROs at any time, subject to certain monetary or time limitations which may be imposed by the insurance company. The market value of any remaining amounts in the GIROs after a client withdrawal are decreased by the amount of the withdrawal. This provides the liquidity part of in the assets held in the client account, which is important to retirees, as explained above.

During a second, life contingent period, periodic distributions are provided to the client by a life contingent annuity ("LCA"), which provides the distributions for at least as long as the client is alive. The life contingent period starts after the end of the certain period, and in the preferred embodiment immediately after the certain period thus providing a continuous stream of periodic distributions. The purchase rate for the LCA is calculated using at least mortality tables and the age and gender of the client. The calculation of the LCA purchase rate could also account for the health of the client and/or joint annuitant. An LCA may be made jointly contingent on the lives of the client and any other person, such as the client's spouse. In that case, the calculation of the LCA purchase rate depends also on the age and gender of the other person and the percentage of the distributions to be made to the survivor after the death of the client or joint annuitant. The linking of one and preferably a series of GIROs with an LCA provides the benefits of the present invention, as explained above. (Typically more than one GIRO would be involved, and the embodiment described below includes a series of GIROs).

Based on the information provided by the client and data stored by the system including interest rates and mortality tables, the Income Manager System determines the amounts of the periodic distributions to be made during the certain and life contingent periods and allocates the initial contribution among the series of GIROs and the LCA. The system manages or administers a client account 32 (FIG. 1) for each certificate issued. The initial contribution is credited into the client account 32, and may be wired from a financial institution account 34, such as an IRA held by a bank or mutual find. The money allocated to the purchase of the GIROs is invested in a separate account 36a with asset-liability matching on an aggregate basis. The separate account is "nonunitized," i.e., the client has no claim on, or participation in the performance of, the assets held in the account. Any favorable investment performance of the assets held in the separate account may thus accrue to the sole benefit of the insurance company. The money allocated to the purchase of the LCA becomes part of the company's general account 36b which is invested with asset-liability matching.

The process of calculating the periodic distributions and allocating the funds is now described with reference to the steps in the flow chart shown in FIGS. 2a–2e and the formulas in the Spreadsheet Appendix. One skilled in the art will understand that the sequence of steps shown in the flow chart is indicative of only one possible sequence by which the process may be implemented and that a spreadsheet program does not necessarily perform the calculations in the sequence shown.

A prospective client first provides a broker (or agent) with basic personal and financial data used by the system, and the broker inputs this data into the system, step 50. This data includes the length of the desired certain period, the length of any desired deferral period, and the type of payment plan desired, i. e., whether the client wishes to receive level payments or increasing payments. The broker also inputs the client's age and gender, and if the client desires a joint LCA, the age and gender of the joint annuitant and the percentage of LCA payments to be made to the survivor. The client is given the choice, step 52, of specifying the amount of the initial contribution to be made towards the purchase of a certificate or the amount of a desired target payment, and the broker inputs the amount of the contribution, step 54, or target payment, step 56. The step of inputting the amount of either an initial contribution or a target payment may be done after the purchase rates are calculated as described below. The relevant data input into the information profile in the Income Manager System is listed under the heading "Information Profile" in the Spreadsheet Appendix.

In steps 58–62, the Income Manager System calculates the purchase rates for the GIROs which will serially mature during the certain period specified by the client. The system stores in memory a table of current GIRO and LCA interest rates. The interest rates may be any desired rates; in the preferred embodiments, the rate for each GIRO is a spread off Treasury rates for the associated GIRO period, and the rate for the LCA is a spread off Treasury rates taken over a longer duration. In the preferred embodiment, the system and method have the capability of updating these interest rates are daily. The interest rates for the current date applicable to the dates of the distributions to be made during the certain period are retrieved from memory, step 58. The purchase rate PR(t) for each GIRO to mature during the certain period is then calculated, steps 60 and 62, using the following equation:

$$PR(t)=(1+i(t))^{-(t-sd)/td},$$

where i(t) is the predetermined interest rate for the GIRO maturing on date t;

sd is a starting date for the program, i. e., the transaction date; and td is a total number of days in a given period. In the preferred embodiment, td is 365 and i(t) is an annualized rate.

The sample report shown in FIG. 3 shows the GIRO purchase rates per $100 calculated as of Apr. 30, 1995 for a fifteen year certain period with no deferral period. The formulas used in the Income Manager System to calculate the GIRO purchases rates are set forth in the Spreadsheet Appendix under the heading "GIRO Purchase Rates."

Figure 2A:
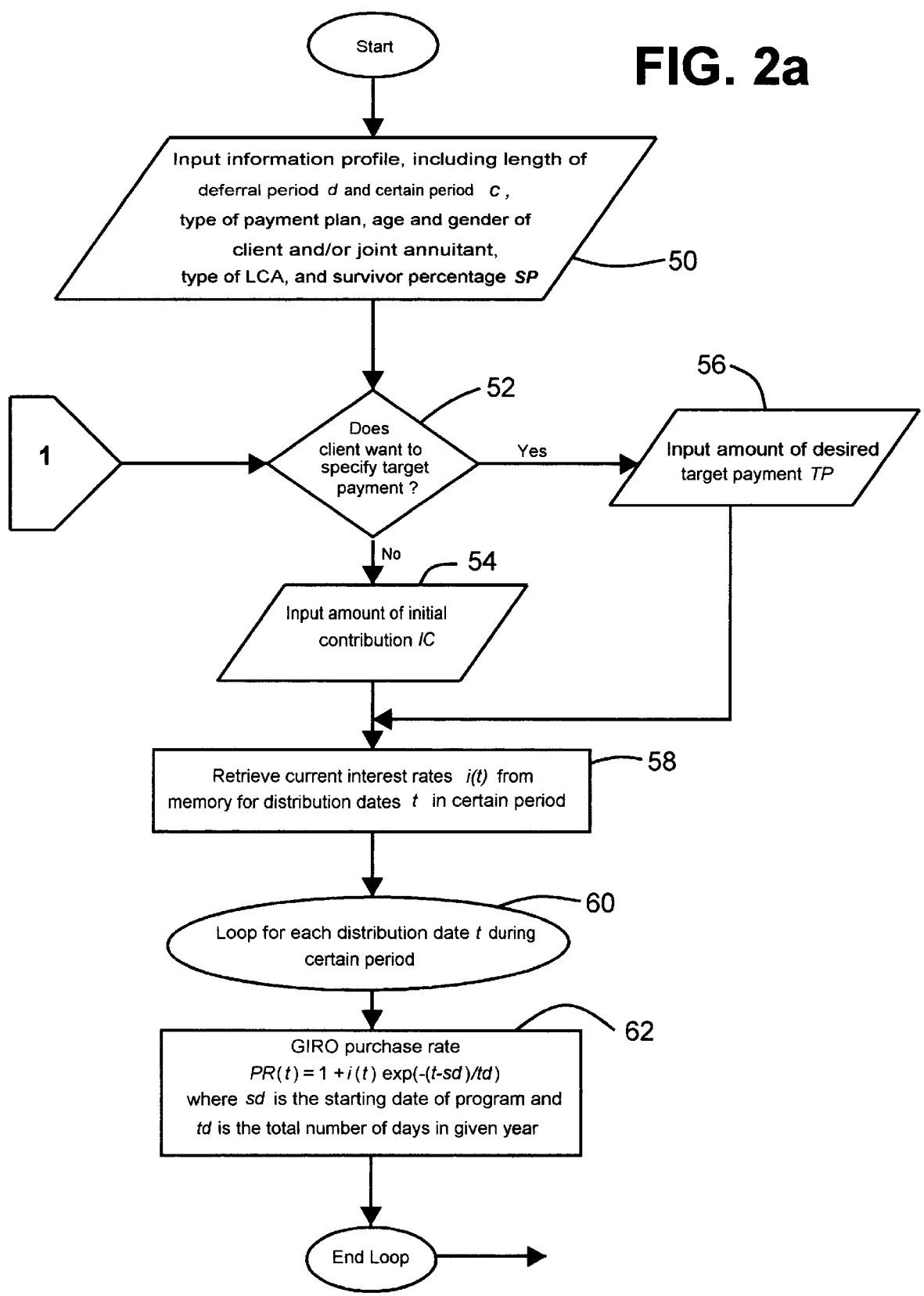
FIGS. 2a–2e contain a flowchart demonstrating operation of the program to provide guaranteed lifetime income with liquidity according to the invention.
Figure 2B:
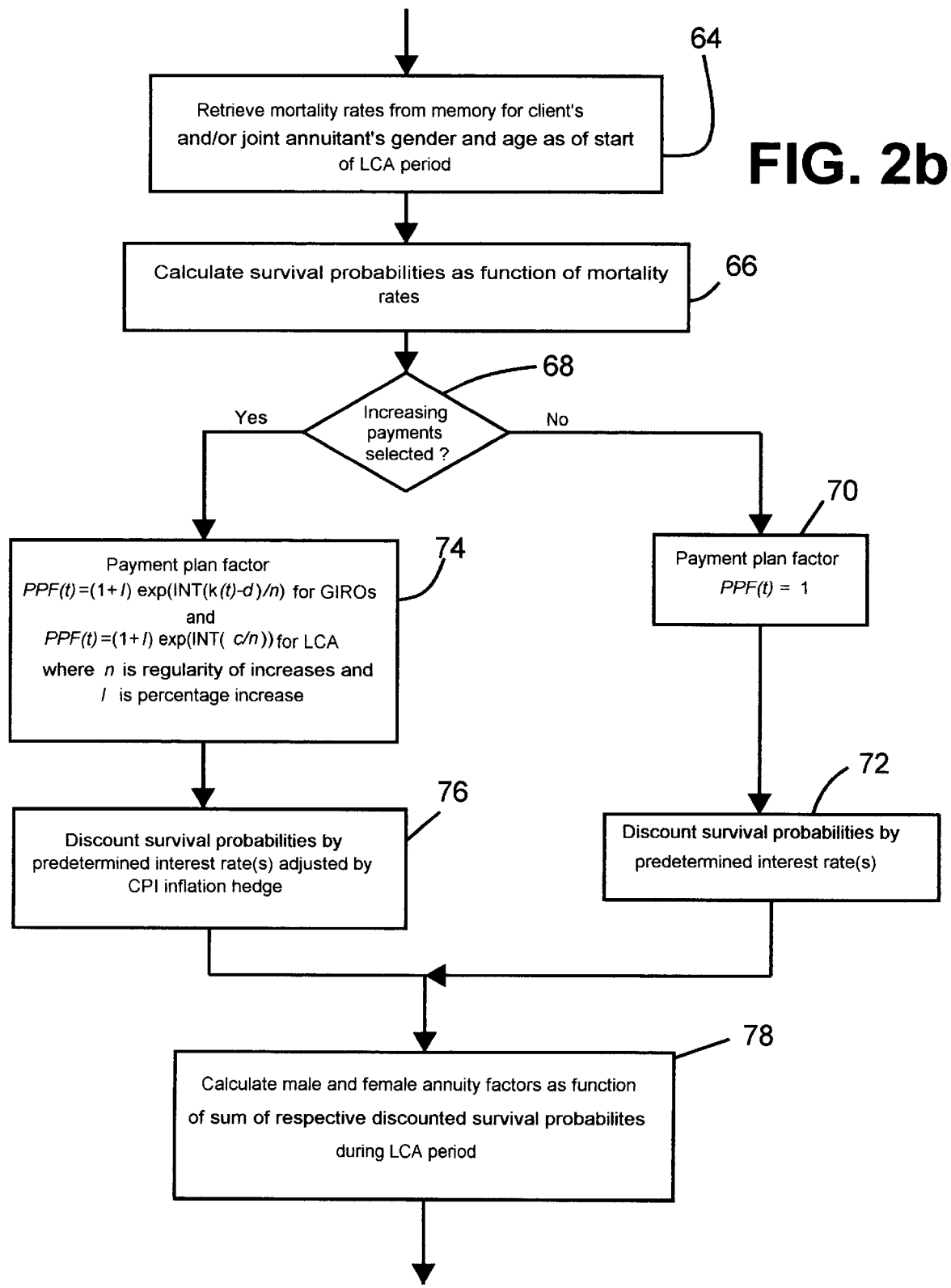
Figure 2C:
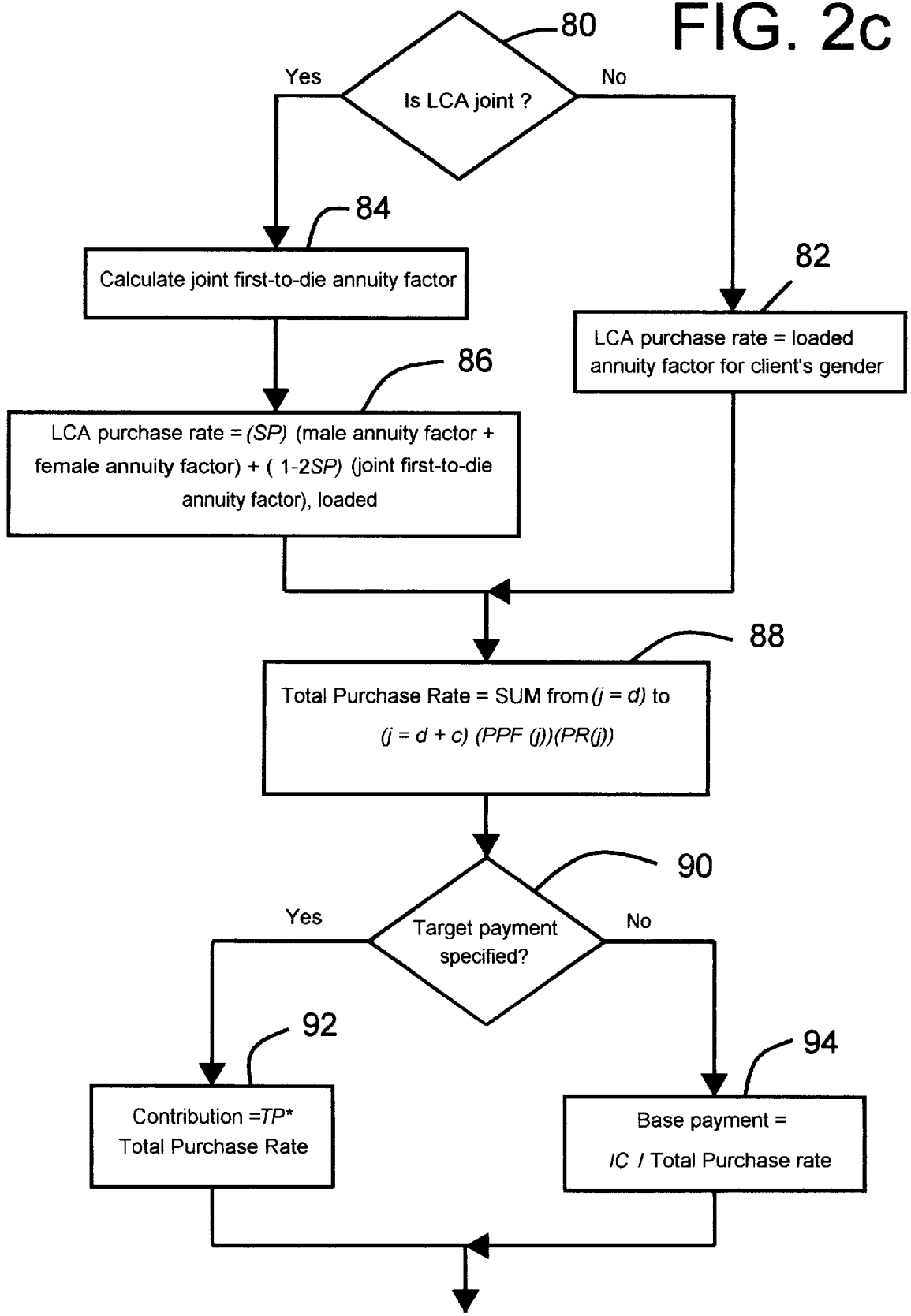
Figure 2D:
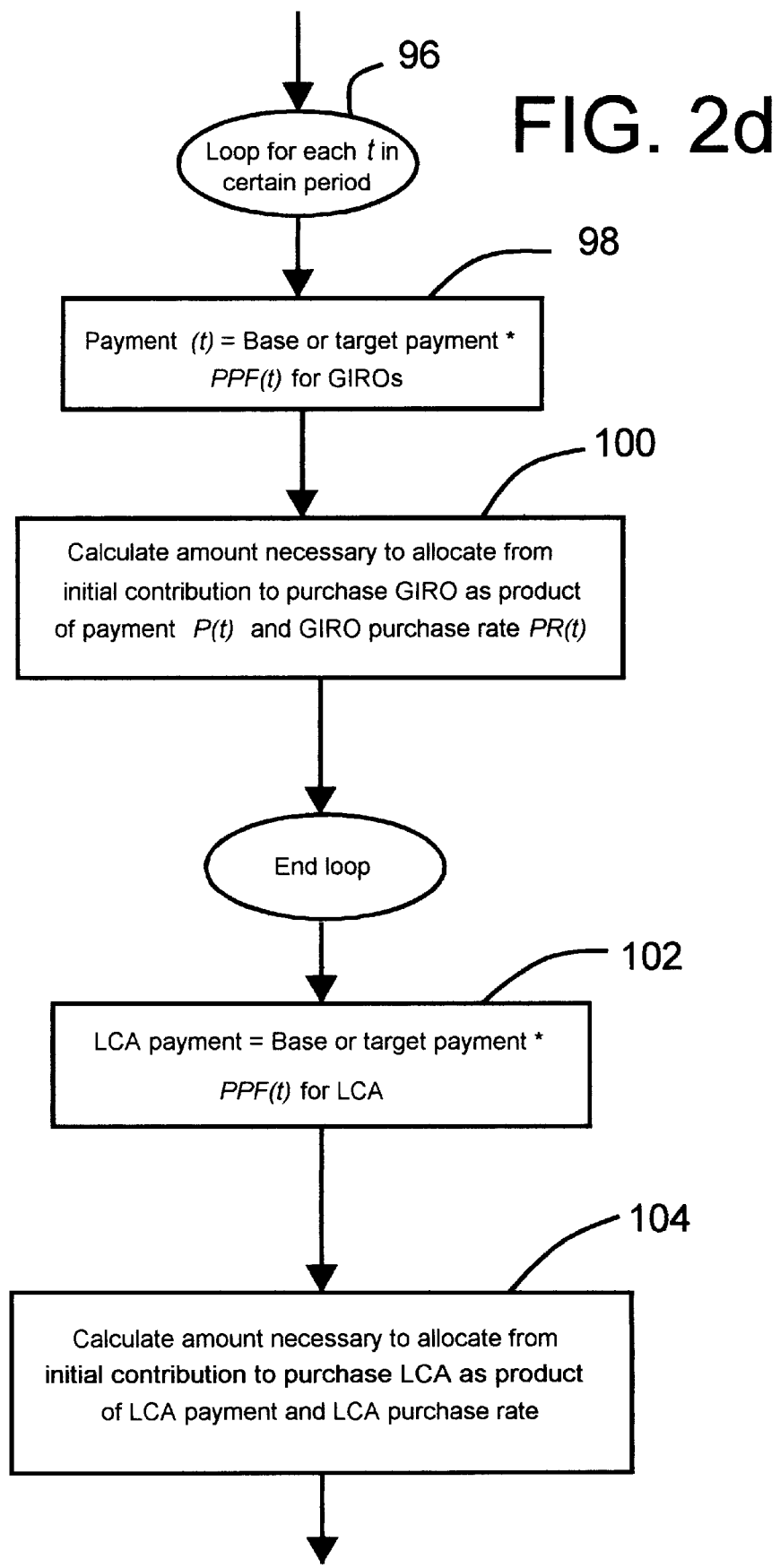
Figure 2E:
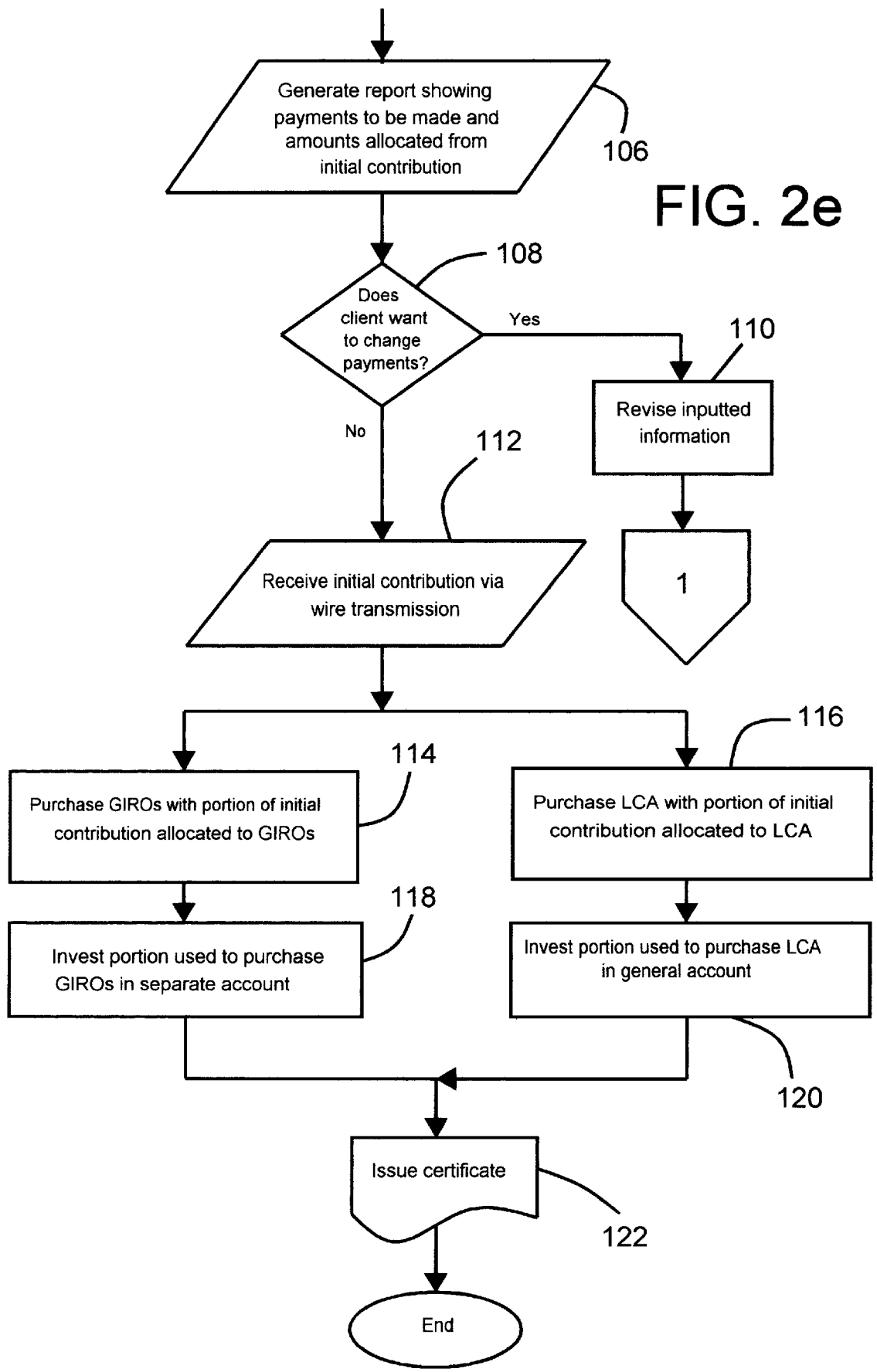

The process of calculating the LCA purchase rate is shown in steps 64–86 of FIGS. 2b–2c. The system stores in memory tables of mortality rates which, in the preferred embodiment, are the publicly available 1983 Individual Annuity Mortality Table "a" for Males and the 1983 Individual Annuity Mortality Table "a" for Females available from the Society of Actuaries. For the client and, if specified, for a joint annuitant, the system retrieves the mortality rates, step 64, from the table of the appropriate gender for the ages starting from the age of the client as of the date the LCA is scheduled to start, i.e., the person's age plus the deferral and certain periods, and ending at the end of the table, i.e., at age 115. The system then calculates survival probabilities for the client and joint annuitant, if any, step 66, as a function of 1 minus the retrieved mortality rates, adjusted by a predetermined mortality charge. See the formulas AnnuityFactorsSinglexArray and AnnuityFactorsSingleyArray in the Spreadsheet Appendix under the heading "LCA Purchase Rate."

As stated earlier, the client specifies the type of payment plan desired, i.e., whether he wishes to receive level distributions or regularly increasing distributions which provide protection against the effects of inflation on the client's purchasing power. If the client has selected a payment plan which provides for level periodic distributions, step 68, a payment plan factor, used in calculating a total purchase rate for the GIROs and LCA, is set to a value of 1, step 70. In addition, the LCA purchase rate is calculated, without accounting for increasing LCA payments, by discounting the survival probabilities, step 72, by an assumed interest rate ("AIR"). In the preferred embodiment, the AIR is the interest rate retrieved from the table of interest rates for the LCA. See the formula AnnuityFactorsDiscountedPaymentsArray in the Spreadsheet Appendix under the heading "LCA Purchase Rate."

If the client has selected a payment plan which provides for regularly increasing periodic distributions, the payment plan factor PPF(t) is set according to the following formula, step 74:

$$PPF(t)=(1+I)^{INT((k(t)-d)/n)}$$

during the certain period, and $$PPF(t)=(1+I)^{INT(c/n)}$$

during the life contingent period, where k(t) is the number of GIRO maturity dates prior to GIRO maturity date t, where k(t)=0 for the nearest GIRO maturity date, d and c are the deferral and certain periods, respectively, specified by the client, INT(x) indicates the integer portion of a number x, I is a percentage increase in the periodic distributions which, in the preferred embodiment, is 0.1 (10%), and n is a number of periods between each of the regular increases in the periodic distributions. In the preferred embodiment, n=3.

Thus, in the preferred embodiment, the periodic distributions increase every three years by 10%. This provides the client with substantial protection against inflationary effects. See the formulas LevelorIncreasingArray under the heading "GIRO Purchase Rates" and FinalLevelorIncreasing under the heading "LCA Purchase Rate" in the Spreadsheet Appendix.

The client's desire to receive increasing payments also affects the calculation of the LCA purchase rate. The survival probabilities are discounted as described above, however, the discounting factors are increased by an inflation hedge which in the preferred embodiment is 3% per year, step 76. See the formula AnnuityFactorsDiscountedPaymentsArray in the Spreadsheet Appendix under the heading "LCA Purchase Rate."

Once the appropriately discounted survival probabilities have been found, male and female annuity factors are calculated, step 78, by finding the sum of the discounted survival probabilities and multiplying it by a factor which represents the survival probability for the first year of the LCA discounted by the AIR and raised to the power of the fraction of the year remaining between the transaction date and the first maturity date. This additional factor accounts for the probability that the client will not survive long enough to receive any distributions under the LCA. See the formulas AnnuityFactorsMale and AnnuityFactorsFemale in the Spreadsheet Appendix under the heading "LCA Purchase Rate." If the LCA is based solely on the life of the client (see step 80), the LCA purchase rate is calculated (step 82) as the appropriate annuity factor increased by a LCA load. See the formulas LCA Load, Annuity Factors Male Loaded, and AnnuityFactorsFemale Loaded in the Spreadsheet Appendix.

If the client has selected a joint LCA (see step 80), an additional, joint first-to-die annuity factor is calculated, step 84. The survival probabilities for a joint LCA may be calculated as the product of the survival probabilities for the client and joint annuitant. For example, if the joint annuitant is the client's spouse, the male and female survival probabilities are multiplied to find the joint survival probabilities. In the preferred embodiment, the joint LCA survival probabilities are found as a more complex function of the individual mortality rates. See the formula AnnuityFactorsJointxyArray under the heading "LCA Purchase Rate" in the Spreadsheet Appendix. The joint survival probabilities are discounted as described above for the single survival probabilities, and the LCA purchase rate is then found, step 86, using the following formula:

$$PR(LCA)=SP*(\text{male annuity factor+female annuity factor})+(1-2SP)*(\text{joint annuity factor}),$$

where

SP=survival percentage specified by the client, e.g., ⅔.

The joint LCA purchase rate is then loaded, as described above. See the formula AnnuityFactorsJointLoaded, and formulas referenced therein, in the Spreadsheet Appendix.

The process of calculating the amounts of the periodic distributions and the amounts allocated from the initial contribution are set forth in steps 88–104 in FIGS. *2c–2d*. Once the GIRO and LCA purchase rates have been calculated, the system calculates a total purchase rate, step 88, which will be used to find either (see step 90) the amount of a base payment for the periodic distributions based on a specified initial contribution (step 94) or the amount of an initial contribution necessary to provide periodic distributions based on a specified target payment (step 92). The total purchase rate is the sum of the individual purchase rates multiplied by the appropriate payment plan factor:

$$PR_{Total} = \sum_{j=d}^{d+c} PPF(j) * PR(j)$$

Applicable premium taxes will be taken into account. For example, certain states impose a premium tax on LCA allocations. The total purchase rate is discounted by this premium tax rate, which is obtained from a tax table stored in system memory and updated accordingly. For allocations from non-qualified certificates, premium taxes are applied to the GIROs as well.

If the client has specified an amount for a target base payment (step 90), the initial contribution is found in step 92 as the product of the total purchase rate $PR_{Total}$ and the target payment. If an initial contribution has been specified (step 90), the base payment for the periodic distributions is found in step 94 as the amount of the initial contribution divided by $PR_{Total}$. See the formulas APPCalculationTargetPayment and APPBasePayment under the heading "Payments and Allocations" in the Spreadsheet Appendix. When the client is a retiree, the initial contribution is usually set by the amount in the retiree's IRA or other account.

Using either the specified target payment or the calculated base payment, the amounts of each periodic distribution to be made on a given anniversary date during the certain period, step 96, is found, step 98, as the product of the base or target payment and the payment plan factor found for the GIRO to mature on the distribution date, as described above. The amounts needed to allocate from the initial contribution towards the purchase of each GIRO are then found, step 100, as the product of the distribution amount and the purchase rate PR(t) for the GIRO. Similarly, the amount of the initial distribution during the life contingent period is found, step 102, as the product of the base or target payment and the payment plan factor for the LCA. The subsequent LCA distributions are then equal to the initial LCA distribution, if a level payment plan was selected, or increased annually by the inflation hedge. The amount needed to allocate for the purchase of the LCA is then found, step 104, as the product of the initial LCA distribution and the LCA purchase rate. See the formula AllocationofContributionArray under the heading "Payments and Allocations" in the Spreadsheet Appendix.

After completing these calculations and allocations, the Income Manager System prints a report, step 106, showing the basic information provided by the client, the amounts of the periodic distributions, the pre and after tax income to be provided, the maturity dates and purchase rates (per $100) of the GIROs and LCA, and the amounts from the initial contribution allocated towards the purchase of each of the GIROs and the LCA. The report is generated in the Income Manager's spreadsheet program by specifying the rows and columns of the desired cells to be included in the report in Excel's Print/Page Setup/Sheet/Print Area command line. FIG. 3 is an example of a report generated for a transaction date of Apr. 30, 1995, with a specified initial contribution of $100,000, no deferral period, a 15 year certain period, a ⅔ joint and survivor LCA contingent on the lives of a male 70 year old client and his 65 year old female spouse, with an increasing payment plan selected.

The report in FIG. 3 shows that, in accordance with the present invention, the base payment is $6,034, which is found by multiplying each of the purchase rates (the amounts listed under the column headed "Price (Per $100 of Contribution)" divided by 100) by the payment plan factor for a payment plan of increasing distributions (with percentage increase I=0.1 and regularity of increases n=3 years), finding the sum of these modified payment plan factors, and dividing the $100,000 initial contribution by this sum. The periodic GIRO distributions were found by multiplying the base $6,034 payment by the applicable purchase rate, e.g., the distribution for the GIRO maturing on Feb. 15, 1999 is $6,034*1.1=$6,638 and the distribution for the GIRO maturing on Feb. 15, 2008 is $6,034*1.1^4=$8,835. The amounts needed to allocate for the purchase of the GIROs and LCA were found by multiplying the distribution by the applicable purchase rate, e.g., the amount allocated to purchase the GIRO maturing on Feb. 15, 2000 is $6,638*0.7608=$5,050. The total amount of all the contributions equals the initial contribution, adjusted by a 2.0% premium tax rate for the state of the client's residence, Kentucky.

The generated report is shown to the prospective client. The client is then given the option, step 108 (FIG. 2) of changing the periodic distributions by changing one or more of the parameters input into the Income Manager System, step 110. If revised information is provided, the system returns to the point after the information profile has been provided, performs the necessary calculations and allocations again, and generates another report for the client's review. In addition, if the initial contribution is provided from an IRA, the system may calculate the minimum distributions required by law and compare these to each of the periodic distributions to ensure that the each periodic distribution is greater than the minimum distribution amount required by law. If any periodic distribution is less than the minimum distribution, it may either be set equal to the minimum distribution, or the periodic distributions may be recalculated by shortening the length of the certain period to ensure that the revised periodic distributions calculated by the system will be higher than the ones previously calculated, or the retiree is advised of the tax consequences of periodic distributions of less than the legal minimum.

Once the client has approved the distribution and allocation scheme generated by the Income Manager System, the client authorizes the transfer of the initial contribution from the financial or other institution holding the assets to the insurance company, step 112. In the case of funds, they may be transferred by wire, such as by electronic funds transfer or EFT. The portion of the initial contribution which the Income Manager System has allocated to the purchase of the GIROs is used to purchase the GIROs, step 114, and is invested in the separate account, step 116, as described above. The portion of the initial contribution which has been allocated to the purchase of the LCA is used to purchase the LCA, step 118, and the funds are invested in the general account, step 120, as described above. A certificate is then issued, step 122, evidencing the client's rights in the GIROs and LCA.

After the certificate has been issued, payments of the periodic distributions are made to the client on the maturity dates. When required by law, taxes may be withheld from the distributions made to the client. The Income Manager System stores federal tax information and tax information of one or more states, and calculates the amounts to be withheld. For certificates issued on a non-qualified basis, i.e., not qualified for tax deferral, the system calculates the portion of each payment which is considered to be a tax-free recovery of investment based on the ratio of the initial contribution to the expected return under the certificate. For the LCA, once the total amount of the investment in the certificate has been recovered by the client, future distributions are fully taxable.

At any time during the certain period, a client may withdraw a lump sum amount from one or more GIROs. Although there are no theoretical limitations on the portion which may be withdrawn during the certain period, the insurance company may impose certain desired administrative restrictions or limitations on withdrawals, such as on the number of withdrawals per year, withdrawal charges, or minimum amount for withdrawals. On any given day, the Income Manager System will, upon request, calculate a market value for the GIROs as the sum of present values of the maturity values of each GIRO using the interest rate in effect for new allocations to such GIRO on such date. This is equivalent to the amount of the periodic distributions to be made from the GIROs increased or decreased by a full market value adjustment, as explained further below.

The Income Manager System makes a market value adjustment whenever a client withdraws all or part of the amounts in the GIROs. The amount of the market value adjustment depends on the difference between the interest rate applicable to the amount being withdrawn and the interest rate applicable as of the date of the withdrawal to new allocations to GIROs with the same maturity dates, as well as on the length of time remaining until the maturity date of the GIROs. In general, if interest rates have risen between the time when an amount was originally allocated to a GIRO and the time it is withdrawn, the market value adjustment will be negative, and vice versa. In addition, one skilled in the art will recognize that a market value adjustment may apply even if interest rates have not changed, depending on the nature of the yield curve for the given GIRO(s). Also, the longer the period of time remaining until the maturity date of the GIRO, the greater the impact of the interest rate difference.

The Income Manager System calculates the market value adjustment due to a withdrawal of all or part of the assets in one or more GIROs as follows. The system first finds the present value of the maturity value of each GIRO by:

(1) determining the maturity value, mv, of the GIRO, which is the amount of the periodic distribution to be made at GIRO maturity;

(2) determining the period remaining, pr, until the maturity date of the GIRO as a fraction of the number of years remaining;

(3) determining the currently applicable interest rate, cir, as of the date of the withdrawal; and (4) calculating the present value of the GIRO, $GIRO_{pv}$, as:

$$GIRO_{pv} = mv/(1+cir)^{pr}.$$

Next, the system calculates the amount in the GIRO as of the date the withdrawal is to be made, $GIRO_w$ as:

$$GIROw = GIRO_{IC} * (1+OIR)^{age},$$

where $GIRO_{IC}$ is the amount from the initial contribution originally allocated to the purchase of the GIRO, OIR is the original interest rate for the GIRO, and age is the period of time that has elapsed since the GIRO was purchased.

Finally, the system finds the market value adjustment by subtracting $GIRO_w$ from $GIRO_{pv}$. If the client withdraws only part of the amount in the GIROs, the market value adjustment is a percentage of the market value adjustment that would be applicable upon a withdrawal of all funds from the GIROs. The Income Manager System determines this percentage by dividing the amount of the withdrawal from the GIROs by the account value of the GIROs prior to the withdrawal.

The following is an example of market value adjustments calculated by the Income Manager System:

$100,000 of an initial contribution are allocated on Feb. 15, 1996 to a GIRO with an expiration date of Feb. 15, 2005 at a guaranteed interest rate of 7.00% resulting in a maturity value at the expiration date of $183,846 (=$100,000 $(1.07)^9$). The client wishes to withdraw $50,000 on Feb. 15, 2000. The following table shows the market value adjustments for assumed current interest rates of 5.0% and 9.0%:

|  | CIR on February 15, 2000 | |
| --- | --- | --- |
|  | 5.00% | 9.00% |
| As of February 15, 2000 (Before Withdrawal) | | |
| (1) present value $GIRO_{pv}$ | $144,048 | $119,487 |
| (2) GIRO amount $GIRO_w$ | 131,080 | 131,080 |
| (3) market value adjustment: (1) − (2) | 12,968 | (11,593) |
| February 15, 2000 (After Withdrawal) | | |
| (4) portion of (3) associated with withdrawal: (3) × [50,000 ÷ (1)] | $ 4,501 | (4,851) |
| (5) reduction in GIRO amount [$50,000 − (4)] | 45,499 | 54,851 |
| (6) GIRO amount: (2) − (5) | 85,581 | 76,229 |
| (7) maturity value | 120,032 | 106,915 |
| (8) present value of (7), also account value | 94,048 | 69,487 |

Under this example, if a withdrawal is made when rates have increased (from 7.00% to 9.00% in the example), a portion of negative market value adjustment is realized. On the other hand, if a withdrawal is made when rates have decreased (from 7.00% to 5.00% in the example), a portion of a positive market value adjustment is realized.

The calculation of $GIRO_w$ analogous to the calculation of a minimum guaranteed death benefit for the GIROs. See the formulas in the Spreadsheet Appendix under the heading "MDBG Calculation."

After a client has made a withdrawal of only part of the assets in one or more GIROs, the remaining assets may be reallocated using the allocation process described above so that the client continues to receive continuous periodic distributions. For example, if the certificate was issued as a non-qualified annuity, for which substantially equal payments are generally required by federal income tax laws, the remaining amounts are reallocated to provide the required substantially equal payments. To perform the reallocation, the system determines the present value of the amounts in the remaining GIROs, as described above, and uses this amount as a new contribution towards the purchase of a new series of GIROs in accordance with the process described above for purchasing GIROs with an initial contribution. In addition, the start date of the LCA is accelerated to provide distributions earlier, although the amount of each distribution under the LCA is reduced accordingly.

The remaining formulas provided in the Spreadsheet Appendix, under the headings "Tax and Payment Accounting" and "Alternative Distribution Plans" relate to additional functions performed by the Income Manager System. These include calculating the client's tax liabilities based on tax rates stored in memory, determining the amounts of payments to be made after withholding taxes, and processing alternate payment plans such as laddered payments specified by the client and minimum distributions required to be made from IRAs. The formulas provided under the heading "Data Validity Checking" check inputted data to ensure it is within permitted ranges and generates appropriate error messages.

Table I summarizes the operation of three partially non-guaranteed embodiments described above which involve investing in non-guaranteed financial vehicles in order to increase the client's return on its initial contribution. In the examples summarized in Table I, the certain period commences 15 years prior to the inception of the life contingent period. The 15 year period is divided into "buckets" of time (first column in Table I) of five years each for which GIROs are purchased. The pre-LCA period may be longer or shorter than 15 years and may be divided into buckets of more than or less than five years each. The first, certain period is the first bucket in the table (0–5 years), followed by two intermediate periods (5–10 years and 10–15 years) which are represented by the second and third buckets. At the inception of the program, and at the end of each five year bucket thereafter, an allocation is made to purchase GIROs which will mature during the next five year bucket. Thus, for a 15 year period of three five year buckets, there will be three allocations, designated in Table I as Allocation Nos. 1, 2 and 3. At allocations subsequent to Allocation No. 1, the amount available to allocate towards the purchase of additional GIROs and an additional LCA is based on the performance of the non-guaranteed financial vehicles in which the amounts referred to in the last column of Table I ("market") are invested. The amount is available to allocate towards the GIROs and LCA is reflected in the current account value as of the time t at which the allocation is to be made, represented by the variable $AV_t$.

The second column of Table I ("Portion of AV (account value) locked in") represents the portion of the total account value locked in to purchase GIROs prior to the current allocation expressed in terms of a payment distribution times the unit cost of a GIRO ($P_t * UC_t$). The unit cost represents the sum of the purchase rates for GIROs during a specified bucket. For example, in the case of the "Guarantee Plus" plan, at Allocation No. 1 no portion of the account value was locked in for any of the buckets, while at Allocation No. 2 the portion of the account value represented by $P_1 * UC_1$ for the first bucket ("0–5", which is the second five year bucket from inception) represents the present value of the GIROs which were purchased, i.e., locked in, from Allocation No. 1, and the portion of the account value represented by $P_1 * UC_2$ represents the present value of the GIROs purchased during the first allocation for the second bucket ("5–10", which is the third five year bucket from inception), which was also locked in from Allocation No. 1. The third column of Table I ("Portion of AV currently locked in") indicates the portion of the account value being locked in by the particular allocation, and the fourth column ("Portion of AV left for market") indicates the portion of the account value left over to invest in non-guaranteed financial vehicles ("market"). For the first bucket of the first allocation, nothing is left for investing in the market, while in the second bucket, the portion of the account value represented by $P_1 * (1.15-1) * UC_1$ is available to invest.

Table I also contains the equations used by the Income Manager System to calculate the amounts of the periodic distributions at any allocation based on the then-current account value, the unit cost for GIROs to be purchased to mature during the next or subsequent buckets, and the percentage increase I to be applied. In the preferred embodiments shown in Table I, I=0.15 or 15%, which represents a 3% increase for each of the five years in a bucket.

As Table I shows, in the "Guarantee Plus" payment plan, amounts are allocated for the purchase of GIROs for the minimum distribution amount calculated at each allocation using the payment plan factor described above for the increasing payment plan. For periods after the first 5 year bucket, the extra amount made available from refraining from the purchase of GIROs which would provide increasing payments under the fully guaranteed increasing payment plan (column 4 of Table I) are invested in the non-guaranteed financial vehicles. The Guarantee Plus plan provides the least amount of risk of the three partially non-guaranteed embodiments.

As Table I further shows, in the Managed Payment Plan, at each allocation only GIROs for the next 5 year bucket and an LCA are purchased, and the remainder of the assets from the initial contribution or any subsequent account value (which would otherwise have been used to purchase additional GIROs for the entire length of what would otherwise have been the certain period) are invested in the market. The Managed Payment Plan provides the greatest amount of risk of the three partially non-guaranteed embodiments, but should provide the greatest return on the client's initial contribution. The APL Appendix attached hereto contains a computer program listing in the APLII programming language which is used by the Income Manager System to implement this embodiment.

Finally, Table I shows the hybrid of the two previously described embodiments, the "Guarantee Plus Plus" plan, in which minimum distribution amount GIROs are purchased in Allocation No. 1 for the first bucket, minimum distribution amount GIROs are also purchased for the second bucket, and the difference (that would otherwise have been used to purchase increasing GIROs to mature during the second bucket) is invested in the market. No GIROs are purchased for the third bucket, and the entire amount that would have been allocated to purchase those GIROs is invested in the market. An LCA is purchased in Allocation No. 1 which will provide for minimum periodic distribution. At Allocation No. 2, the increased account value due to a positive return on the market investments is used to purchase additional GIROs for the next period and an additional LCA. The Guarantee Plus Plus plan provides a mix of security and risk

TABLE I†

|  | Bucket | Portion of AV locked in | Portion of AV currently locked in | Portion of AV left for market |
|---|---|---|---|---|
| I. Guarantee Plus | | | | |
| ALLOCATION No. 1 | 0–5 | 0 | $P_1 * UC_1$ | 0 |
| $P_1 = \dfrac{AV_0}{UC_1 + 1.15 * UC_2 + 1.15^2 * UC_3 + 1.15^3 * UC_1^{LCA}}$ | 5–10 | 0 | $P_1 * UC_2$ | $P_1 * (1.15 - 1) * UC_2$ |
|  | 10–15 | 0 | $P_1 * UC_3$ | $P_1 * (1.15^2 - 1) * UC_3$ |
|  | 15+ | 0 | $P_1 * UC_1^{LCA}$ | $P_1 * (1.15^3 - 1) * UC_1^{LCA}$ |
| ALLOCATION No. 2 | 0–5 | $P_1 * UC_1$ | $(P_2 - P_1) * UC_1$ | 0 |
| $P_2 = \dfrac{AV_5 + P_1 * (UC_1 + UC_2 + UC_2^{LCA})}{UC_1 + 1.15 UC_2 + 1.15^2 UC_2^{LCA}}$ | 5–10 | $P_1 * UC_1$ | $(P_2 - P_1) * UC_2$ | $P_2(1.15 - 1) * UC_2$ |
|  | 10–15 | $P_1 * UC_2^{LCA}$ | $(P_2 - P_1) * UC_2^{LCA}$ | $P_2(1.15^2 - 1) * UC_2^{LCA}$ |
| ALLOCATION No. 3 | 0–5 | $P_2 * UC_1$ | $(P_3 - P_2) * UC_1$ | 0 |
| $P_3 = \dfrac{AV_{10} + P_2 * (UC_3^{LCA} + UC_1)}{UC_3 + 1.15 UC_3^{LCA}}$ | 5–10 | $P_2 * UC_3^{LCA}$ | $(P_3 - P_2) * UC_3^{LCA}$ | $P_3 * (1.15 - 1) * UC_3^{LCA}$ |
| II. Guarantee Plus Plus | | | | |
| ALLOCATION No. 1 | 0–5 | 0 | $P_1 * UC_1$ | 0 |
| $P_1$ = Same as Guarantee Plus | 5–10 | 0 | $P_1 * UC_2$ | $P_1 * (1.15 - 1) * UC_2$ |
|  | 10–15 | 0 | 0 | $P_1 * 1.15^2 * UC_3$ |
|  | 15+ | 0 | $P_1 * UC_1^{LCA}$ | $P_1 * (1.15^3 - 1) * UC_1^{LCA}$ |
| ALLOCATION No. 2 | 0–5 | $P_1 UC_1$ | $(P_2 - P_1) * UC_1$ | 0 |
| $P_3 = \dfrac{AV_{10} + P_2 * (UC_1 + UC_3^{LCA})}{UC_1 + 1.15 UC_3^{LCA}}$ | 5–10 | 0 | $P_2 * UC_2$ | $P_2 * (1.15 - 1) * UC_2$ |
|  | 10–15 | $P_1 * UC_2^{LCA}$ | $(P_2 - P_1) * UC_2^{LCA}$ | $P_2(1.15^2 - 1) * UC_2^{LCA}$ |
| ALLOCATION No. 3 | 0–5 | $P_2 UC_1$ | $(P_3 - P_2) * UC_1$ | 0 |
| $P_3 = \dfrac{AV_{10} + P_2 * (UC_1 + UC_3^{LCA})}{UC_1 + 1.15 UC_3^{LCA}}$ | 5–10 | $P_2 UC_3^{LCA}$ | $(P_3 - P_2) * UC_3^{LCA}$ | $P_3 * (1.15 - 1) * UC_2^{LCA}$ |
| III. Managed Payment Program | | | | |
| ALLOCATION No. 1 | 0–5 | 0 | $P_1 * UC_1$ | 0 |
| $P_1$ = Same as Guarantee Plus | 5–10 | 0 | 0 | $P_1 * 1.15 * UC_2$ |
|  | 10–15 | 0 | 0 | $P_1 * 1.15^2 * UC_3$ |
|  | 15+ | 0 | $P_1 * UC_1^{LCA}$ | $P_1 * (1.15^3 - 1) * UC_2^{LCA}$ |
| ALLOCATION No. 2 | 0–5 | 0 | $P_2 * UC_1$ | 0 |
| $P_2 = \dfrac{AV_5 + P_1 * UC_2^{LCA}}{UC_1 + 1.15 UC_2 + 1.15^2 UC_2^{LCA}}$ | 5–10 | 0 | 0 | $P_2 * 1.15 * UC_2$ |
|  | 10–15 | $P_1 * UC_2^{LCA}$ | $(P_2 - P_1) * UC_2^{LCA}$ | $P_2 * (1.15^2 - 1) * UC_2^{LCA}$ |
| ALLOCATION No. 3 | 0–5 | 0 | $P_3 * UC_1$ | 0 |
| $P_2 = \dfrac{AV_{10} + P_2 * UC_3^{LCA}}{UC + 1.15 UC_3^{LCA}}$ | 5–10 | $P_2 * UC_3^{LCA}$ | $(P_3 - P_2) * UC_3^{LCA}$ | $P_3 * (1.15 - 1) * UC_3^{LCA}$ |

† $\begin{cases} UC_t & = \text{unit cost for } t - th \text{ bucket} \\ UC_t^{LCA} & = UC \text{ for } LCA \text{ at } t - th \text{ allocation} \end{cases}$

What is claimed is:

1. A method performed at least partially by a programmed computer for administering at least part of a program to provide a person with guaranteed lifetime income with a measure of liquidity using at least an initial contribution of assets, the method comprising:

calculating an amount of each of a series of periodic distributions to be made for the person's life during at least a first and a second period in the person's lifetime based on an information profile provided by the person and stored data, wherein the first period begins on a given date and has a definite duration and the second period begins after the end of the first period and extends at least for as long as the person is alive;

allocating a first portion of the initial contribution towards the purchase of at least one guaranteed financial vehicle having a determinable market value at any time so as to be capable of being liquidated in whole or in part and which will provide the person with at least one of the periodic distributions during the first period; and allocating a second portion of the initial contribution towards the purchase of at least one life contingent financial vehicle which will provide the person with one or more of the periodic distributions during the second period for as long as the person lives.

2. The method of claim 1 wherein the step of allocating a second portion of the initial contribution comprises allocating an amount exactly equal to the initial contribution less the first portion.

3. The method of claim I further comprising calculating the market value of the one or more guaranteed financial vehicles as of a date a withdrawal may be made of all or part of the first portion of the assets allocated to one or more guaranteed financial vehicles based on an interest rate determined as of the date the withdrawal may be made.

4. The method of claim 1 further comprising:

receiving the initial contribution;

using the first portion of the initial contribution for the purchase of the at least one guaranteed financial vehicle;

using the second portion of the initial contribution for the purchase of the at least one life contingent financial vehicle; and making payments to the person of the periodic distributions.

5. The method of claim 4 further comprising:

calculating the market value of the one or more guaranteed financial vehicles as of a date a withdrawal may be made of all or part of the first portion of the assets allocated to one or more guaranteed financial vehicles based on an interest rate determined as of the date the withdrawal may be made;

in response to a request by the person to withdraw all of the first portion of the assets, providing the person with an amount equal to the market value of the first portion of the assets allocated to the one or more guaranteed financial vehicles; and in response to a request by the person to withdraw part of the first portion of the assets, providing the person an amount equal to the part requested by the person and determining the amount of any assets remaining in the first portion of the assets adjusted by the market value of the part withdrawn.

6. The method of claim 5 further comprising reallocating any remaining assets in the first portion towards the purchase of at least one guaranteed financial vehicle having a determinable market value which will provide the person with at least one guaranteed periodic distribution during the first period.

7. The method of claim 1 further comprising:

entering into the programmed computer an information profile including a payment plan selected by the person and an amount of the initial contribution.

8. The method of claim 7 further comprising:

determining purchase rates for each of the at least one guaranteed financial vehicle and the at least one life contingent financial vehicle based on the payment plan selected and the stored data;

wherein the step of calculating the amounts of the periodic distributions is implemented by the programmed computer using the following formula:

$$P(t) = \frac{IC * PPF(t)}{\sum_{j=d}^{d+c} PPF(j) * PR(j)}$$

wherein, t is a date on which a distribution is to be made to the person;

P(t) is the amount of the distribution to be made on date t;

IC is the amount of the initial contribution;

PPF(t) is a payment plan factor at date t which depends on the payment plan selected by the person;

PR(t) is the purchase rate of a given financial vehicle maturing on date t;

d is the difference between a date on which the initial contribution is received and a start date of the first period; and c is the length of the first period.

9. The method of claim 8 wherein the steps of allocating a first portion and allocating a second portion of the initial contribution comprises calculating an allocation for each financial vehicle as the product of the periodic distribution to be made from the financial vehicle and the purchase rate for the financial vehicle.

10. The method of claim 8 wherein the step of calculating the amount of each of the periodic distributions comprises calculating a level periodic distribution by setting PPF(t)=1.

11. The method of claim 8 wherein the step of calculating the amount of each of the periodic distributions comprises calculating regularly increasing periodic distributions by setting: $PPF(t)=(1+I)^{INT((k(t)-d)/n)}$ during the first period, and $PPF(t)=(1+I)^{INT(c/n)}$ during the second period, wherein:

k(t) is a number of possible distribution dates prior to the date t on which a distribution is to be made, I is a percentage increase in the periodic distributions, and n is a number of periods between each of the regular increases in the periodic distributions.

12. The method of claim 8 wherein the step of determining purchase rates for each of the guaranteed financial vehicles comprises calculating a purchase rate for a given guaranteed financial vehicle according to the following formula:

$$PR(t)=(1+i(t))^{-(t-sd)/td},$$

wherein:

i(t) is a predetermined interest rate for a financial vehicle maturing on date t;

sd is a starting date for the program; and td is a total number of days in a given year.

13. The method of claim 8:

wherein entering an information profile into the programmed computer further includes inputting into the programmed computer at least the person's age, gender and marital status, and, if the person is married, whether the at least one life contingent financial vehicle will be contingent on the life of the person alone orjointly with the life of a second person and, if jointly, a survivorship percentage for the at least one life contingent financial vehicle;

further comprising storing in the programmed computer a database of male and female mortality rates and establishing a database of survival probabilities for the person and/or the second person based at least on the mortality rates and the person's and/or second person's age and gender; and wherein determining a purchase rate for the at least one life contingent financial vehicle is based at least on the information profile and the survival probabilities.

14. The method of claim 7 further comprising:

revising the information profile entered into the programmed computer; and calculating a revised amount of each the periodic distributions to be made based on the revised information.

15. The method of claim 1 wherein the person is a retiree and the initial contribution is an amount contained in a retirement account, and further comprising:

calculating minimum amounts required by law to be distributed from the retirement account during the first and second periods;

comparing each of the calculated minimum amounts to each associated calculated periodic distribution; and generating a message if any given minimum amount exceeds any associated periodic distribution.

16. The method of claim 15 further comprising:

generating and outputting on an output device a report showing at least the revised amounts of the periodic distributions.

17. The method of claim 1 further comprising generating and outputting on an output device a report showing at least the amounts of the periodic distributions.

18. A computer system for administering at least part of a program to provide a person with guaranteed lifetime income with a measure of liquidity using at least an initial contribution of assets, comprising:

means for inputting an information profile based on data received from the person;

means for storing financial and statistical data necessary for the calculation of a series of financial vehicle purchase rates;

programmed processing means for:
  (a) calculating an amount of each of a series of periodic distributions to be made for the person's life during at least a first and a second period in the person's lifetime based on the inputted information profile and the stored data, wherein the first period begins on a given date and has a definite duration and the second period begins after the end of the first period and extends at least for as long as the person is alive;
  (b) allocating a first portion of an initial contribution of assets towards the purchase of at least one guaranteed financial vehicle having a determinable market value at any time so as to be capable of being liquidated in whole or in part and which will provide the person with at least one of the periodic distributions during the first period; and
  (c) allocating a second portion of the initial contribution towards the purchase of at least one life contingent financial vehicle which will provide the person with one or more of the periodic distributions during the second period for as long as the person lives; and means for outputting the calculated amounts of the periodic distributions.

19. The system of claim 18, comprising an output device coupled to the means for outputting.

20. The system of claim 18, comprising a memory device coupled to the means for outputting.

21. The system of claim 18, wherein the programmed processing means calculates said amounts based on target, lifetime income information input to the system, and further calculates the amount of the initial contribution.

22. The system of claim 18 wherein the programmed processing means calculates the amount of the periodic distributions based on the amount of an initial contribution input to the system.

23. A system for processing and administering a client account comprising a combination of serially maturing guaranteed financial vehicles having a determinable market value at any time so as to be capable of being liquidated and at least one life contingent financial vehicle, such that the client account provides the client with lifetime income based at least on an initial contribution of assets, comprising:

means for receiving the initial contribution of assets;

means for calculating an amount of each of a series of periodic distributions to be made for the person's life during at least a first and a second period in the person's lifetime based on an inputted information profile and stored data, wherein the first period begins on a given date and has a definite duration and the second period begins after the end of the first period and extends at least for as long as the person is alive means for allocating a first portion of the initial contribution towards the purchase of the guaranteed financial vehicles which will provide the person with periodic distributions during the first period; and means for allocating a second portion of the initial contribution towards the purchase of the at least one life contingent financial vehicle which will provide the person with periodic distributions during the second period for as long as the person lives;

means for purchasing the guaranteed financial vehicles with the first portion and the at least one life contingent financial vehicle with the second portion; and means for generating a message on the dates the periodic distributions are to be made.

24. The method of claim 1 comprising the step of allocating a third portion of the initial contribution towards the purchase of at least one non-guaranteed financial vehicle.

25. The method of claim 24 further comprising:

receiving the initial contribution;

using the first portion for the purchase of the at least one guaranteed financial vehicle;

using the second portion for the purchase of the at least one life contingent financial vehicle; and using the third portion for the purchase of the at least one non-guaranteed financial vehicle.

26. The method of claim 1 wherein the second period starts immediately following the end of the first period and wherein the step of calculating the amount of each of the periodic distributions comprises calculating the amounts so that the periodic distributions are to be made without any break in continuity between the periodic distributions to be made during the first and second periods.

27. The method of claim 26 further comprising, in the event of a withdrawal during the first period of all or part of the first portion of the assets allocated towards the purchase of the at least one guaranteed financial vehicle, accelerating the beginning of the second period to thereby prevent any break in the continuity between the periodic distributions to be made during the first and second periods.

28. The method of claim 27 wherein only part of the first portion of the assets are withdrawn, further comprising reallocating an amount representing a portion of the first portion of the assets remaining after the withdrawal towards the purchase of at least one guaranteed financial vehicle to provide one or more periodic distributions during the first period until the accelerated beginning of the second period.

29. The method of claim 28 wherein the steps of reallocating the remaining portion of the first portion and of accelerating the beginning of the second period are performed such that periodic distributions like those before the withdrawal are made as a result of these steps after the withdrawal.

30. A method performed at least partially by a programmed computer for administering at least part of a program to provide a person with guaranteed lifetime income with a measure of liquidity using at least an initial contribution of assets, the method comprising:

calculating an amount of each of a series of periodic distributions to be made for the person's life during at least a first and a second period in the person's lifetime based on an information profile provided by the person and stored data, wherein the first period begins on a given date and has a definite duration and the second period begins after the end of the first period and extends at least for as long as the person is alive;

allocating a first portion of the initial contribution towards the purchase of at least one guaranteed financial vehicle having a determinable market value at any time so as to be capable of being liquidated in whole or in part and which will provide the person with at least part of the periodic distributions during the first period;

allocating a second portion of the initial contribution towards the purchase of at least one life contingent financial vehicle which will provide the person with one or more of the periodic distributions during the second period for as long as the person lives; and investing a third portion of the initial contribution in at least one non-guaranteed financial vehicle.

31. The method of claim 30 further comprising, at least once after the start of the first period, the steps of:

withdrawing at least part of the third portion invested in the at least one non-guaranteed financial vehicle; and one of the following:

allocating the amount withdrawn from the non-guaranteed financial vehicle towards the purchase of at least one additional guaranteed financial vehicle having a determinable market value at any time so as to be capable of being liquidated in whole or in part and which will provide the person with additional periodic distributions during the remainder of the first period; or allocating the amount withdrawn from the non-guaranteed financial vehicle towards the purchase of at least one additional life contingent financial vehicle which will provide the person with one or more additional periodic distributions during the second period for as long as the person lives; or allocating a first part of the amount withdrawn from the non-guaranteed financial vehicle towards the purchase of at least one additional guaranteed financial vehicle having a determinable market value at any time so as to be capable of being liquidated in whole or in part and which will provide the person with additional periodic distributions during the remainder of the first period and a second part of the amount withdrawn from the non-guaranteed financial vehicle towards the purchase of at least one additional life contingent financial vehicle which will provide the person with one or more additional periodic distributions during the second period for as long as the person lives.

32. The method of claim 31 wherein the steps of withdrawing at least part of the third portion and allocating the amount withdrawn towards the purchase of additional financial vehicles are perfomed a plurality of times at regular intervals during the first period.

33. The method of claim 31 further comprising investing at least part of the amount withdrawn from the non-guaranteed financial vehicle in at least one non-guaranteed financial vehicle.

34. The method of claim 30 wherein:

the step of calculating the amount of each of the periodic distributions comprises calculating regularly increasing periodic distributions;

the steps of allocating the first and second portions comprise allocating the first and second portions towards the purchase of the at least one guaranteed financial vehicle and the at least one life contingent financial vehicle, respectively, such that the periodic distributions remain constant over time; and the step of investing the third portion comprises:

determining a total cost of purchasing the guaranteed and life contingent financial vehicles necessary to provide the increasing periodic distributions as calculated;

calculating the third portion as the difference between the total cost of purchasing the guaranteed and life contingent financial vehicles as calculated and a total amount of the first and second portions as allocated; and investing the calculated third portion in at least one non-guaranteed financial vehicle.

35. The method of claim 30 wherein the second period does not start immediately after the end of the first period but after the end of one or more sequential intermediate periods which follow the end of the first period, the method further comprising:

at the start of any given intermediate period, withdrawing at least part of the third portion invested in at least one non-guaranteed financial vehicle; and one of the following:

allocating the amount withdrawn from the at least one non-guaranteed financial vehicle towards the purchase of at least one guaranteed financial vehicle having a determinable market value at any time so as to be capable of being liquidated in whole or in part and which will provide the person with periodic distributions at least during the given intermediate period; or allocating the amount withdrawn from the non-guaranteed financial vehicle towards the purchase of at least one additional life contingent financial vehicle which will provide the person with one or more additional periodic distributions during the second period for as long as the person lives; or allocating a first part of the amount withdrawn from the at least one non-guaranteed financial vehicle towards the purchase of at least one guaranteed financial vehicle having a determinable market value at any time so as to be capable of being liquidated in whole or in part and which will provide the person with periodic distributions at least during the given intermediate period and a second part of the amount withdrawn from the non-guaranteed financial vehicle towards the purchase of at least one additional life contingent financial vehicle which will provide the person with one or more additional periodic distributions during the second period for as long as the person lives.

36. The method of claim 35 further comprising investing a third part of the amount withdrawn from the at least one non-guaranteed financial vehicle in at least one non-guaranteed financial vehicle.

37. The method of claim 36 wherein the second period starts after the end of a plurality of sequential intermediate periods.

38. The method of claim 35 wherein:

the step of calculating the amounts of the periodic distributions to be made during at least the first and second periods comprises calculating the amounts of periodic distributions to be made during the first, second, and all intermediate periods; and the step of investing the third portion comprises:

determining a total cost of purchasing the guaranteed and life contingent financial vehicles necessary to provide periodic distributions as calculated;

calculating the third portion as the difference between the total cost of purchasing the guaranteed and life contingent financial vehicles as calculated and the first and second portions as allocated; and investing the calculated third portion in at least one non-guaranteed financial vehicle.

39. A computer usable medium having computer readable program code means embodied in said medium for causing said computer to perform method steps for processing and administering a client account to provide a client with guaranteed lifetime income with a measure of liquidity using at least an initial contribution of assets, the method comprising:

calculating an amount of each of a series of periodic distributions to be made for the client's life during at least a first and a second period in the client's lifetime based on an information profile provided by the client and stored data, wherein the first period begins on a given date and has a definite duration and the second period begins after the end of the first period and extends at least for as long as the client is alive;

allocating a first portion of the initial contribution towards the purchase of at least one guaranteed financial vehicle having a determinable market value at any time so as to be capable of being liquidated in whole or in part and which will provide the client with at least part of the periodic distributions during the first period; and allocating a second portion of the initial contribution towards the purchase of at least one life contingent financial vehicle which will provide the client with one or more of the periodic distributions during the second period as long as the client lives.

40. A system for processing and administering a client account comprising a combination of serially maturing guaranteed financial vehicles having a determinable market value at any time so as to be capable of being liquidated in whole or in part at least one life contingent financial vehicle, and at least one non-guaranteed financial vehicle, the client account providing the client with lifetime income based at least on an initial contribution of assets, comprising:

means for receiving the initial contribution of assets;

means for calculating an amount of each of a series of periodic distributions to be made for the client's life during at least a first and a second period in the client's lifetime based on an inputted information profile and stored data, wherein the first period begins on a given date and has a definite duration and the second period begins after the end of the first period and extends at least for as long as the person is alive;

means for allocating a first portion of the initial contribution towards the purchase of the guaranteed financial vehicles which will provide the client with periodic distributions during the first period; and means for allocating a second portion of the initial contribution towards the purchase of the at least one life contingent financial vehicle which will provide the client with periodic distributions during the second period for as long as the client lives;

means for purchasing the guaranteed financial vehicles with the first portion and the at least one life contingent financial vehicle with the second portion;

means for investing a third portion of the initial contribution in at least one non-guaranteed financial vehicle; and means for generating a message on the dates the periodic distributions are to be made.

41. A method performed at least partially by a programmed computer for administering at least part of a program to provide a person with guaranteed lifetime income with a measure of liquidity using at least an initial contribution of first assets, the method comprising:

calculating an amount of each of a series of periodic distributions to be made for the person's life during at least a first and a second period in the person's lifetime based on an information profile provided by the person and stored data, wherein the first period begins on a given date and has a definite duration and the second period begins after the end of the first period and extends at least for as long as the person is alive;

matching second assets with a liability to make the calculated distributions, comprising:

allocating a first portion of the initial contribution towards the purchase of at least one guaranteed financial vehicle having a determinable market value at any time so as to be capable of being liquidated and which will provide the person with at least one of the periodic distributions during the first period;

allocating a second portion of the initial contribution towards the purchase of at least one life contingent financial vehicle which will provide the person with one or more of the periodic distributions during the second period for as long as the person lives; and correlating the first and second portions of the initial contribution with the at least one guaranteed financial vehicle and the at least one life contingent financial vehicle, respectively, in an account designated for the person.

42. The method of claim 41 wherein the step of correlating comprises purchasing the at least one guaranteed financial vehicle with the first portion of the initial contribution.

43. The method of claim 41 wherein the step of correlating comprises purchasing the at least one life contingent financial vehicle with the second portion of the initial contribution.

44. The method of claim 41 wherein the step of correlating comprises investing the first portion in a separate account the assets of which are matched with liabilities arising from a plurality of guaranteed financial vehicles on an aggregate basis.

45. The method of claim 41 wherein the step of correlating comprises investing the second portion in a general account the assets of which are matched with liabilities arising from a plurality of life contingent vehicles.

* * * * *